(12) United States Patent
Zhou et al.

(10) Patent No.: US 10,321,072 B2
(45) Date of Patent: Jun. 11, 2019

(54) IMAGE OBTAINING APPARATUS AND METHOD FOR OBTAINING AN IMAGE BASED ON PIXEL BINNING

(71) Applicant: Beijing Zhigu Rui Tuo Tech Co., Ltd, Beijing (CN)

(72) Inventors: Hanning Zhou, Beijing (CN); Dayong Ding, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/117,184

(22) PCT Filed: Jan. 15, 2015

(86) PCT No.: PCT/CN2015/070766
§ 371 (c)(1),
(2) Date: Aug. 5, 2016

(87) PCT Pub. No.: WO2015/135395
PCT Pub. Date: Sep. 17, 2015

(65) Prior Publication Data
US 2017/0006239 A1   Jan. 5, 2017

(30) Foreign Application Priority Data

Mar. 13, 2014   (CN) .......................... 2014 1 0092661

(51) Int. Cl.
*G06T 5/00*   (2006.01)
*G06T 5/40*   (2006.01)
(Continued)

(52) U.S. Cl.
CPC ............. *H04N 5/347* (2013.01); *G06T 5/007* (2013.01); *G06T 5/40* (2013.01); *G06T 5/50* (2013.01);
(Continued)

(58) Field of Classification Search
None
See application file for complete search history.

(56) References Cited

U.S. PATENT DOCUMENTS 8,704,908 B1 *   4/2014   Aldrich .............. H04N 5/23212
348/222.1
2006/0077269 A1   4/2006   Kindt et al.
(Continued)

FOREIGN PATENT DOCUMENTS

CN   101904166 A   12/2010
CN   102090068 A   6/2011
(Continued)

OTHER PUBLICATIONS

International Search Report for PCT Application No. PCT/CN2015/070764, dated Apr. 22, 2015, 2 pages.
(Continued)

*Primary Examiner* — Justin P. Misleh
(74) *Attorney, Agent, or Firm* — Amin, Turocy & Watson, LLP

(57) ABSTRACT

Image processing technologies, an image acquisition method and an image acquisition apparatus are provided. A method comprises exposing an image sensor, reading a charge on the image sensor and performing analog-to-digital conversion, where a charge of pixels on a partial region of the photosensitive sensor is read by means of pixel binning according to data characteristics of an image of a target scene, and obtaining a target image of the target scene according to the read charge. Local combination can be performed on at least two images of different image quality according to data characteristics of the images, so that the dynamic range and/or signal-to-noise ratio can be improved
(Continued)

locally on the basis of presenting image details as fully as possible, that is, the image quality can be improved according to requirements.

24 Claims, 4 Drawing Sheets

(51) Int. Cl.
*G06T 5/50* (2006.01)
*H04N 5/232* (2006.01)
*H04N 5/235* (2006.01)
*H04N 5/347* (2011.01)
*H04N 5/355* (2011.01)

(52) U.S. Cl.
CPC ....... *H04N 5/2355* (2013.01); *H04N 5/23229* (2013.01); *H04N 5/355* (2013.01)

(56) References Cited

U.S. PATENT DOCUMENTS

| | | | | |
|---|---|---|---|---|
| 2006/0119903 | A1* | 6/2006 | Chiba | H04N 3/1512 358/474 |
| 2009/0066782 | A1* | 3/2009 | Choi | H04N 3/155 348/25 |
| 2009/0225189 | A1* | 9/2009 | Morin | H04N 5/345 348/229.1 |
| 2009/0244350 | A1 | 10/2009 | Wada | |
| 2010/0026839 | A1 | 2/2010 | Border et al. | |
| 2010/0295962 | A1 | 11/2010 | Terauchi | |
| 2012/0092529 | A1 | 4/2012 | Choi et al. | |
| 2013/0027589 | A1* | 1/2013 | Johansson | G06T 5/40 348/241 |
| 2013/0083201 | A1 | 4/2013 | Takacs | |
| 2013/0335599 | A1 | 12/2013 | Zhang | |
| 2014/0347526 | A1 | 11/2014 | Hara et al. | |

FOREIGN PATENT DOCUMENTS

| | | |
|---|---|---|
| CN | 102236890 A | 11/2011 |
| CN | 102497516 A | 6/2012 |
| CN | 102510450 A | 6/2012 |
| CN | 102693538 A | 9/2012 |
| CN | 103096000 A | 5/2013 |
| CN | 103402061 A | 11/2013 |
| CN | 103888679 A | 6/2014 |
| CN | 103888689 A | 6/2014 |

OTHER PUBLICATIONS

Office Action dated Apr. 6, 2017 for U.S. Appl. No. 15/117,183, 27 pages.
International Search Report for PCT Application No. PCT/CN2015/070766, dated Apr. 27, 2015, 2 pages.
"Fujifilm announces Super CCD EXR" Sep. 22, 2008, published online at [http://www.dpreview.com/news/2008/9/22/fujifilmEXR], retrieved on Aug. 4, 2016, 8 pages.
Butler, Richard. "Fujifilm Finepix F200 EXR Review" Apr. 30, 2009, published online at [http://www.dpreview.com/reviews/fujifilmf200exr/2], retrieved on Aug. 4, 2016, 8 pages.

* cited by examiner

IMAGE OBTAINING APPARATUS AND METHOD FOR OBTAINING AN IMAGE BASED ON PIXEL BINNING

RELATED APPLICATION

The present application is a U.S. National Stage filing under 35 U.S.C. § 371 of international patent cooperation treaty (PCT) application No. PCT/CN2015/070766, filed Jan. 15, 2015, and entitled "IMAGE ACQUISITION METHOD AND IMAGE ACQUISITION APPARATUS", which claims the benefit of priority to Chinese Patent Application No. 201410092661.1, filed on Mar. 13, 2014 which applications are hereby incorporated herein by reference in their respective entireties.

TECHNICAL FIELD

The present application relates to the field of image processing technologies, and in particular, to an image acquisition method and an image acquisition apparatus.

BACKGROUND

With the development of the digital age and the advance of computer software and hardware technologies, users have increasingly higher requirements on the quality of digital images. In contrast to analog signals, digitization refers to processing information by digital means. For example, a digital camera (DC) is a camera that converts an optical image into electronic data by using an image sensor. The image sensor is a photosensitive charge-coupled device (CCD) or complementary metal-oxide-semiconductor (CMOS). During image acquisition, light passing through a lens is focused on a CCD or CMOS, the CCD or CMOS converts the light into an electrical signal and stores the electrical signal, then the electrical signal is converted into a digital signal by means of analog-to-digital conversion and stored, and an image can be formed after the digital signal is processed by a computer, a display, a printer, or the like.

After an image is digitized, resolution, dynamic range, signal-to-noise ratio and the like become important indicators for evaluating image quality. The image resolution refers to precision of an image, that is, the number of pixels per inch of the image, and the higher the resolution is, the more precise the image is and the more information can be displayed by an image of a same size. The dynamic range refers to a relative ratio between the brightest part and the darkest part of a scene, and is a technical term that describes mathematically the brightness level range of a given scene. The signal-to-noise ratio reflects image quality, that is, reflects whether an image is clean and free of noise. A large signal-to-noise ratio indicates a clean image picture without noticeable noise interference (manifested as "grain" and "snow"), which is pleasant to look at; a small signal-to-noise ratio indicates that there may be snow all over the picture, which seriously affects the image picture. There are many methods for improving image quality in the prior art, but usually one indicator can only be improved by sacrificing another indicator. For example, the dynamic range is improved by sacrificing the resolution, but as a result, image details are reduced; or the image resolution is improved by sacrificing the signal-to-noise ratio, but too much noise is caused.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed descriptions of the various embodiments that follow in the disclosure.

An example, non-limiting objective of the present application is to provide an image acquisition solution.

To these and/or related ends, in a first aspect, an embodiment of the present application provides an image acquisition method. The method comprises:

exposing an image sensor;

reading a charge on the image sensor and performing analog-to-digital conversion, where a charge of pixels on a partial region of the photosensitive sensor is read by means of pixel binning according to data characteristics of an image of a target scene; and obtaining a target image of the target scene according to the read charge.

In a second aspect, an embodiment of the present application provides an image acquisition apparatus. The apparatus comprises:

an exposure control module, configured to expose an image sensor;

an analog-to-digital conversion module, configured to read a charge on the image sensor and perform analog-to-digital conversion, where a charge of pixels on a partial region of the photosensitive sensor is read by means of pixel binning according to data characteristics of an image of a target scene; and a processing module, configured to obtain a target image of the target scene according to the read charge.

In a third aspect of the embodiments of the present application, a computer readable storage device is provided, comprising at least one executable instruction, which, in response to execution, causes a system comprising a processor to perform operations, comprising:

exposing an image sensor;

reading charge on the image sensor and performing analog-to-digital conversion, wherein charge of pixels on a partial region of the photosensitive sensor is read by means of pixel binning according to data characteristics of an image of a target scene; and obtaining a target image of the target scene according to the read charge.

In a fourth aspect of the embodiments of the present application, a device for image acquisition is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

exposing an image sensor;

reading charge on the image sensor and performing analog-to-digital conversion, wherein charge of pixels on a partial region of the photosensitive sensor is read by means of pixel binning according to data characteristics of an image of a target scene; and obtaining a target image of the target scene according to the read charge.

In a method and apparatus of example embodiments of the present application, local combination is performed on at least two images of different image quality according to data characteristics of the images, so that the dynamic range and/or signal-to-noise ratio can be improved locally on the basis of presenting image details as fully as possible, that is, the image quality can be improved according to requirements.

DETAILED DESCRIPTION

Figure 1:
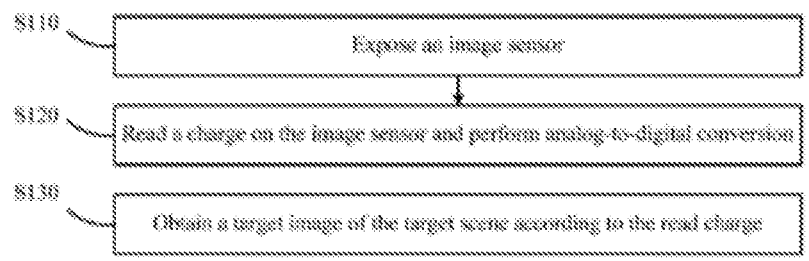
FIG. 1 is an example flowchart of an image acquisition method according to an embodiment of the present application.

Embodiments of the present application are described in further detail below with reference to the accompanying drawings (in which like elements are denoted by like reference numerals) and embodiments. The following embodiments are intended to describe the present application, but not to limit the scope of the present application.

For a better understanding of the embodiments of the present application, the principle of digital image acquisition is described below.

An image is focused on a photosensitive element by using an optical system (photoelectric conversion), and a target scene is "decomposed" into individual pixels according to a certain arrangement manner. These pixels are transferred to an "analog-to-digital converter" in the form of analog image signals. After analog-to-digital conversion, a photoelectric signal on each pixel of the photosensitive element is converted into a digital signal. Then, a digital image is generated after image processing, and stored into a storage medium. Moreover, in the embodiments of the present application, an image sensor refers to a photosensitive element, comprising a CCD sensor or a CMOS sensor.

As shown in FIG. 1, an image acquisition method of an embodiment of the present application comprises the following steps:

S110. Expose an image sensor once formally, and gather a target scene on pixels of the image sensor in the form of analog image signals by means of photoelectric conversion.

S120. Read charge on the image sensor and perform analog-to-digital conversion, where charge of pixels on a partial region of the photosensitive sensor is read by means of pixel binning according to data characteristics of an image of the target scene.

In a method of this embodiment of the present application, the data characteristics of the image may refer to features that represent digital image characteristics, such as grayscale distribution, amount of noise and amount of information, of the image. Considering that image quality can be evaluated by indicators such as resolution, signal-to-noise ratio and dynamic range, regions that need a relatively high dynamic range, regions that have a relatively large amount of noise, details that need to be presented, and the like of the target scene can be determined according to the data characteristics of the image. Preferably, in the method of this embodiment of the present application, local pixel binning is performed on the basis of maintaining a relatively high resolution (preferably, full-pixel resolution) of the image sensor according to the data characteristics of the image, so as to obtain a relatively high dynamic range and/or a relatively high signal-to-noise ratio of the image locally. Moreover, in the method of this embodiment of the present application, pixel binning refers to combining information of a group of pixels (for example, two, four or more pixels) into one pixel, so as to reduce picture noise and improve the photosensitivity, and such pixel binning reduces the resolution of the image at the same time.

S130. Obtain a target image of the target scene according to the read charge.

In conclusion, in a method of this embodiment of the present application, a charge of pixels on a partial region of an image sensor is read by means of pixel binning according to data characteristics of an image of a target scene, so that the dynamic range and/or signal-to-noise ratio can be improved locally on the basis of presenting image details as fully as possible, that is, the image quality can be improved according to requirements.

In order to determine the "partial region" on the photosensitive sensor, of which the charge is read by means of pixel binning, the method of this embodiment of the present application further comprises:

Determine the partial region according to at least one reference image of the target scene, where the resolution of the reference image is lower than the full-pixel resolution of the image sensor.

In a method of this embodiment of the present application, the reference image is usually an image of the target scene whose resolution is lower than the full resolution of the image sensor, and the reference image may be obtained before image acquisition, that is, obtained before the formal exposure. For example, the reference image is a preview image of the target scene obtained by framing of a viewfinder (an optical viewfinder, a TTL viewfinder, an electronic viewfinder, or the like) before the formal exposure of the target scene. Correspondingly, the method of this embodiment of the present application further comprises the following step:

Obtain the at least one reference image.

After the at least one reference image is obtained, the partial region may be determined according to a dynamic range of the at least one reference image. Specifically, the determining the partial region according to at least one reference image of the target scene step S140 may comprise:

Analyze a histogram of the reference image region by region.

A histogram is a way to show the precision of image exposure by using graphical parameters, and describes a grayscale distribution curve of an image within an image display range. The horizontal axis of the histogram may represent the number of pixels from black (dark area) to white (bright area) of an image, for example, a Level value at the darkest point is 0, and a Level value at the brightest point is 225. The vertical axis of the histogram represents the number of pixels at given Level values.

Determine the partial region according to the histogram.

According to the histogram generated, it can be determined whether an analyzed region needs to maintain a high dynamic range. For example, a threshold number of pixels may be preset for determining whether a high dynamic range needs to be maintained. If the number of pixels at given Level values (for example, comprising dark areas and bright areas) exceeds the threshold, it is determined that the current region is a region that needs to maintain a high dynamic range. For another example, an information entropy threshold may be preset for determining whether a high dynamic range needs to be maintained. If an information entropy of a region is higher than the information entropy threshold, it is determined that the current region is a region that needs to maintain a high dynamic range. The threshold number of pixels and the information entropy threshold may be set according to relevant experience of the target scene. Correspondingly, the determining the partial region according to the histogram may further comprise:

Determine a target region according to the preset threshold number of pixels or the preset information entropy threshold.

After regions that need to maintain a high dynamic range are determined, a set of these regions constitutes the target region.

Perform upsampling processing on the target region according to the full-pixel resolution of the image sensor.

Determine the partial region on the image sensor corresponding to the target region.

After the partial region on the image sensor is determined, the charge of the partial region can be read by means of pixel binning in the step S120.

In addition, after the at least one reference image is obtained, the partial region may be determined according to a signal-to-noise ratio of the at least one reference image in the determining the partial region according to at least one reference image of the target scene of the method of this embodiment of the present application. Specifically, in an example where there are two reference images, the determining the partial region according to at least one reference image of the target scene may comprise:

Perform downsampling processing on a second reference image of a second resolution according to a first reference image of a first resolution in the at least one reference image, where the first resolution is lower than the second resolution.

Calculate, according to an image obtained by the downsampling processing and the second reference image, a mean square error of noise signals region by region.

Determine a target region on the second reference image according to the mean square error.

For example, a voltage value of the second reference image is subtracted from voltage values of corresponding pixels of the image obtained by downsampling to approximately obtain noise signals, and then a mean square error of the noise signals of the region is calculated to obtain a noise variance of the region. If the noise variance is higher than a noise threshold, it is determined that the region is a region that needs to maintain a high signal-to-noise ratio. After regions that need to maintain a high signal-to-noise ratio are determined one by one, a set of these regions constitutes the target region. The noise threshold may be set in the following manner:

Assuming that t1 is a numerical statistic (a median value, a mean value, or the like) of the mean square errors of all regions and t2 is an empirical value set of the system and related to the target scene, the noise threshold may be set as: $n=t1*u+t2*(1-u)$, where u is a parameter for adjusting combination weights of t1 and t2, has a value range of [0 to 1], and is set according to different images to be processed. For example, in a surveillance camera, because the image scene processed is relatively fixed, u may take a relatively large value.

The above description is only an exemplary method for finding a target region that needs to maintain a high signal-to-noise ratio, and it can be understood by a person skilled in the art that the partial region may also be found by using other signal-to-noise ratio calculation methods. For example, in a case where there is one reference image, the signal-to-noise ratio of the image may be estimated approximately as the ratio of a signal variance to a noise variance. First, local variances of all pixels in the region are calculated, where the maximum local variance is regarded as the signal variance and the minimum local variance is regarded as the noise variance; and the ratio of the signal variance to the noise variance is calculated, then converted to a dB number, and finally modified by an empirical formula.

Perform upsampling processing on the target region according to the full-pixel resolution of the image sensor.

Determine the partial region on the image sensor corresponding to the target region.

It should be noted that, as the target scene varies, there may be a special case: the determined partial region (region needing to maintain a high dynamic range and/or a high signal-to-noise ratio) of which the charge needs to be read by means of pixel binning may include a part having abundant semantic information, such as a human face, a sign or a license plate, and such contents should be displayed in enough detail, that is, regions corresponding to such contents should maintain a high resolution and tolerate a relatively low signal-to-noise ratio and/or dynamic range; therefore, such a region whose semantic information exceeds a preset threshold should not be comprised in the determined partial region, in order that the image acquired by using the method of this embodiment of the present application can maintain relatively abundant semantic information.

Correspondingly, the determining the partial region according to at least one reference image of the target scene of the method of this embodiment of the present application further comprises:

Detect semantic information of the at least one reference image. Semantic information detection is a mature technology in the art, which is not described herein again.

It should be noted that, in order to prevent the boundary of the partial region of which the charge is read by means of pixel binning from causing blocky artifacts, the term "region" in various region-by-region processing on images used in this embodiment of the present application may be of an irregular shape, and the whole image is divided by using a jigsaw puzzle method.

In conclusion, in a method of this embodiment of the present application, a charge of pixels on a partial region of an image sensor is read by means of pixel binning according to data characteristics of an image of a target scene, so that the dynamic range and/or signal-to-noise ratio can be improved locally on the basis of presenting image details as fully as possible, that is, the image quality can be improved according to requirements. In addition, high-resolution details of a region having abundant semantic information can still be displayed, and the boundary of the region of which the charge is read by means of pixel binning is smooth, which avoids a region boundary visible to naked eyes, thereby achieving good user experience.

It should be understood by a person skilled in the art that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

Figure 2:
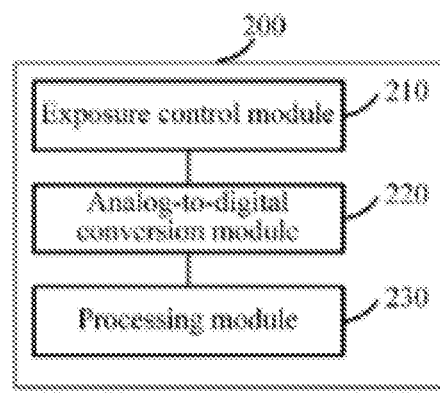
FIG. 2 is a first example structural block diagram of an image acquisition apparatus according to an embodiment of the present application.

An embodiment of the present application further provides an image acquisition apparatus. The apparatus may be a digital camera or any other device that has an image acquisition function, such as a mobile phone, a portable computer or a wearable device. The apparatus may entirely or partly be a part of the foregoing device, or be an apparatus independent of the foregoing device. As shown in FIG. 2, an image acquisition apparatus 200 provided by an embodiment of the present application comprises: an exposure control module 210, an analog-to-digital conversion module 220, and a processing module 230.

The exposure control module 210 is configured to expose an image sensor once, and gather a target scene on pixels of the image sensor in the form of analog image signals by means of photoelectric conversion.

The analog-to-digital conversion module 220 is configured to read charge on the image sensor and perform analog-to-digital conversion, where charge of pixels on a partial region of the photosensitive sensor is read by means of pixel binning according to data characteristics of an image of a target scene.

In an apparatus of this embodiment of the present application, the data characteristics of the image may refer to features that represent digital image characteristics, such as grayscale distribution, amount of noise and amount of information, of the image. Considering that image quality can be evaluated by indicators such as resolution, signal-to-noise ratio and dynamic range, regions that need a relatively high dynamic range, regions that have a relatively large amount of noise, details that need to be presented, and the like of the target scene can be determined according to the data characteristics of the image. Preferably, in the apparatus of this embodiment of the present application, local pixel binning is performed on the basis of maintaining a relatively high resolution (preferably, full-pixel resolution) of the image sensor according to the data characteristics of the image, so as to obtain a relatively high dynamic range and/or a relatively high signal-to-noise ratio of the image locally. Moreover, in the apparatus of this embodiment of the present application, pixel binning refers to combining information of a group of pixels (for example, two, four or more pixels) into one pixel, so as to reduce picture noise and improve the photosensitivity, and such pixel binning reduces the resolution of the image at the same time.

The processing module 230 is configured to obtain a target image of the target scene according to the read charge.

In conclusion, in an apparatus of this embodiment of the present application, a charge of pixels on a partial region of an image sensor is read by means of pixel binning according to data characteristics of an image of a target scene, so that the dynamic range and/or signal-to-noise ratio can be improved locally on the basis of presenting image details as fully as possible, that is, the image quality can be improved according to requirements.

Figure 3:
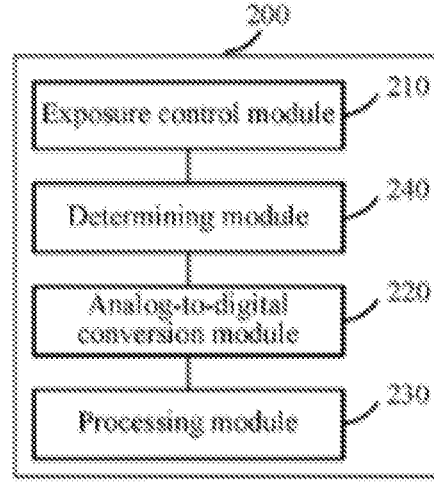
FIG. 3 is a second example structural block diagram of an image acquisition apparatus according to an embodiment of the present application.

In order to determine the "partial region" on the photosensitive sensor, of which the charge is read by means of pixel binning, as shown in FIG. 3, the apparatus 200 of this embodiment of the present application further comprises:

a determining module 240, configured to determine the partial region according to at least one reference image of the target scene, where the resolution of the reference image is lower than the full-pixel resolution of the image sensor.

Figure 4:
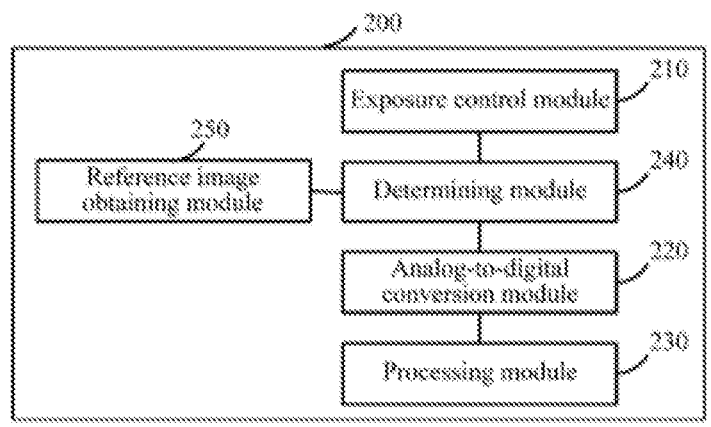
FIG. 4 is a third example structural block diagram of an image acquisition apparatus according to an embodiment of the present application.

In an apparatus of this embodiment of the present application, the reference image is usually an image of the target scene whose resolution is lower than the full resolution of the image sensor, and the reference image may be obtained before image acquisition, that is, obtained before the formal exposure. For example, the reference image is a preview image of the target scene obtained by framing of a viewfinder (an optical viewfinder, a TTL viewfinder, an electronic viewfinder, or the like) before the formal exposure of the target scene. Correspondingly, as shown in FIG. 4, the apparatus 200 of this embodiment of the present application further comprises:

a reference image obtaining module 250, configured to obtain the at least one reference image.

Figure 5:
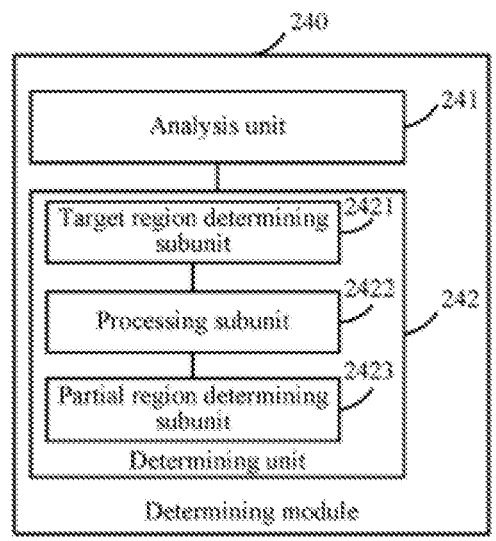
FIG. 5 is an example structural block diagram of a determining module in an image acquisition apparatus according to an embodiment of the present application.

After the at least one reference image is obtained, the determining module 240 of the apparatus of this embodiment of the present application may determine the partial region according to a dynamic range of the at least one reference image. Specifically, as shown in FIG. 5, the determining module 240 may comprise: an analysis unit 241 and a determining unit 242.

The analysis unit 241 is configured to analyze a histogram of the reference image region by region.

A histogram is a way to show the precision of image exposure by using graphical parameters, and describes a grayscale distribution curve of an image within an image display range. The horizontal axis of the histogram may represent the number of pixels from black (dark area) to white (bright area) of an image, for example, a Level value at the darkest point is 0, and a Level value at the brightest point is 225. The vertical axis of the histogram represents the number of pixels at given Level values.

The determining unit 242 is configured to determine the partial region according to the histogram.

According to the histogram generated by the analysis unit 241, it can be determined whether an analyzed region needs to maintain a high dynamic range. For example, a threshold number of pixels may be preset for determining whether a high dynamic range needs to be maintained. If the number of pixels at given Level values (for example, comprising dark areas and bright areas) exceeds the threshold, it is determined that the current region is a region that needs to maintain a high dynamic range. For another example, an information entropy threshold may be preset for determining whether a high dynamic range needs to be maintained. If an information entropy of a region is higher than the information entropy threshold, it is determined that the current region is a region that needs to maintain a high dynamic range. The threshold number of pixels and the information entropy threshold may be set according to relevant experience of the target scene. Correspondingly, the determining unit 242 may further comprise: a target region determining subunit 2421, a processing subunit 2422, and a partial region determining subunit 2423.

The target region determining subunit 2421 is configured to determine a target region according to a preset threshold number of pixels or a preset information entropy threshold.

After regions that need to maintain a high dynamic range are determined, a set of these regions constitutes the target region.

The processing subunit 2422 is configured to perform upsampling processing on the target region according to the full-pixel resolution of the image sensor.

The partial region determining subunit 2423 is configured to determine the partial region on the image sensor corresponding to the target region.

After the partial region determining subunit 2423 determines the partial region on the image sensor, the analog-to-digital conversion module 220 can read the charge of the partial region by means of pixel binning.

Figure 6:
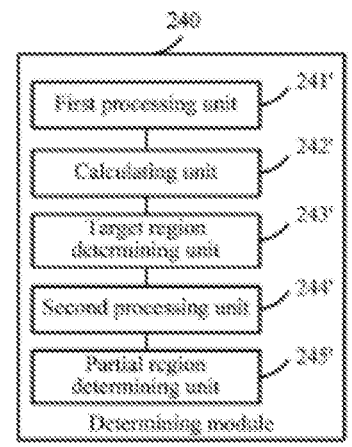
FIG. 6 is another example structural block diagram of a determining module in an image acquisition apparatus according to an embodiment of the present application.

In addition, after the at least one reference image is obtained, the determining module 240 of the apparatus of this embodiment of the present application may further determine the partial region according to a signal-to-noise ratio of the at least one reference image. Specifically, in an example where there are two reference images, as shown in FIG. 6, the determining module 240 may further comprise: a first processing unit 241', a calculating unit 242', a target region determining unit 243', a second processing unit 244', and a partial region determining unit 245'.

The first processing unit 241' is configured to perform downsampling processing on a second reference image of a second resolution according to a first reference image of a first resolution in the at least one reference image, where the first resolution is lower than the second resolution.

The calculating unit 242' is configured to calculate, according to an image obtained by the downsampling processing and the second reference image, a mean square error of noise signals region by region.

The target region determining unit 243' is configured to determine a target region on the second reference image according to the mean square error.

For example, a voltage value of the second reference image is subtracted from voltage values of corresponding pixels of the image obtained by downsampling to approximately obtain noise signals, and then a mean square error of the noise signals of the region is calculated to obtain a noise variance of the region. If the noise variance is higher than a noise threshold, it is determined that the region is a region that needs to maintain a high signal-to-noise ratio. After regions that need to maintain a high signal-to-noise ratio are determined one by one, a set of these regions constitutes the target region. The noise threshold may be set in the following manner:

Assuming that t1 is a numerical statistic (a median value, a mean value, or the like) of the mean square errors of all regions and t2 is an empirical value set of the system and related to the target scene, the noise threshold may be set as: n=t1*u+t2*(1−u), where u is a parameter for adjusting combination weights of t1 and t2, has a value range of [0 to 1], and is set according to different images to be processed. For example, in a surveillance camera, because the image scene processed is relatively fixed, u may take a relatively large value.

The above description is only an exemplary method for finding a target region that needs to maintain a high signal-to-noise ratio, and it can be understood by a person skilled in the art that the partial region may also be found by using other signal-to-noise ratio calculation methods. For example, in a case where there is one reference image, the signal-to-noise ratio of the image may be estimated approximately as the ratio of a signal variance to a noise variance. First, local variances of all pixels in the region are calculated, where the maximum local variance is regarded as the signal variance and the minimum local variance is regarded as the noise variance; and the ratio of the signal variance to the noise variance is calculated, then converted to a dB number, and finally modified by an empirical formula.

The second processing unit 244' is configured to perform upsampling processing on the target region according to the full-pixel resolution of the image sensor.

The partial region determining unit 245' is configured to determine the partial region on the image sensor corresponding to the target region.

It should be noted that, as the target scene varies, there may be a special case: the determined partial region (region needing to maintain a high dynamic range and/or a high signal-to-noise ratio) of which the charge needs to be read by means of pixel binning may include a part having abundant semantic information, such as a human face or a license plate, and such content should be displayed in enough detail, that is, should maintain a high resolution and can tolerate a relatively low signal-to-noise ratio and/or dynamic range; therefore, a region whose semantic information exceeds a preset threshold should not be comprised in the determined partial region, in order that the image acquired by using the apparatus of this embodiment of the present application can maintain relatively abundant semantic information.

Correspondingly, the determining module 240 of the apparatus of this embodiment of the present application further comprises:

a detection unit, configured to detect semantic information of the at least one reference image. Semantic information detection is a mature technology in the art, which is not described herein again.

It should be noted that, in order to prevent the boundary of the partial region of which the charge is read by means of pixel binning from causing blocky artifacts, the term "region" in various region-by-region processing on images used in this embodiment of the present application may be of an irregular shape, and the whole image is divided by using a jigsaw puzzle method.

In conclusion, in an apparatus of this embodiment of the present application, a charge of pixels on a partial region of an image sensor is read by means of pixel binning according to data characteristics of an image of a target scene, so that the dynamic range and/or signal-to-noise ratio can be improved locally on the basis of presenting image details as fully as possible, that is, the image quality can be improved according to requirements. In addition, high-resolution details of a region having abundant semantic information can still be displayed, and the boundary of the region of which the charge is read by means of pixel binning is smooth, which avoids a region boundary visible to naked eyes, thereby achieving good user experience.

Figure 7:
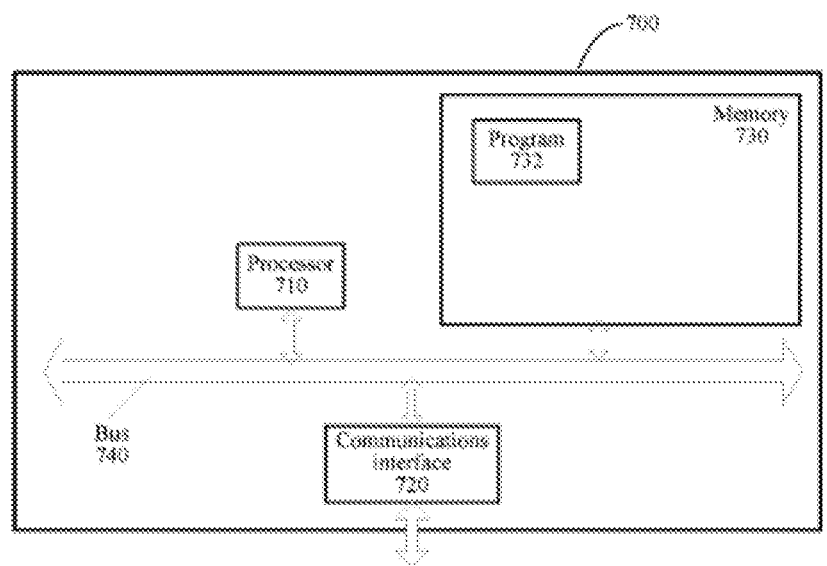
FIG. 7 is still another example structural block diagram of an image acquisition apparatus according to an embodiment of the present application.

FIG. 7 is a schematic structural diagram of another image acquisition apparatus 700 according to an embodiment of the present application. Specific embodiments of the present application are not intended to limit the specific implementation of the image acquisition apparatus 700. As shown in FIG. 7, the image acquisition apparatus 700 may comprise:

a processor 710, a communications interface 720, a memory 730, and a communications bus 740.

The processor 710, the communications interface 720, and the memory 730 communicate with each other by using the communications bus 740.

The communications interface 720 is configured to communicate with a network element such as a client.

The processor 710 is configured to execute a program 732, and specifically can implement relevant functions of the foregoing image acquisition apparatuses in the apparatus embodiments shown in FIG. 3 to FIG. 6.

Specifically, the program 732 may comprise program code, where the program code comprises a computer operation instruction.

The processor 710 may be a central processing unit (CPU), or an application specific integrated circuit (ASIC), or may be configured as one or more integrated circuits that implement the embodiments of the present application.

The memory 730 is configured to store the program 732. The memory 730 may comprise a high speed random access memory (RAM), and may also comprise a non-volatile memory such as at least one magnetic disk storage. The program 732 may specifically execute the following steps:

exposing an image sensor;

reading a charge on the image sensor and performing analog-to-digital conversion, where a charge of pixels on a partial region of the photosensitive sensor is read by means of pixel binning according to data characteristics of an image of a target scene; and obtaining a target image of the target scene according to the read charge.

Figure 8:
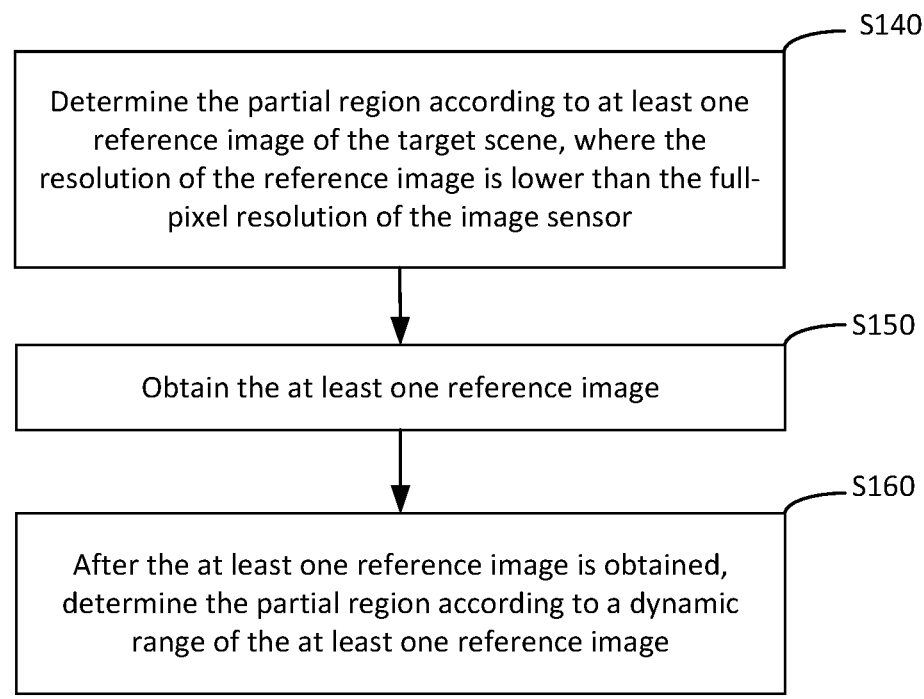

FIG. 8 is a flow diagram of an example method in accordance with an embodiment of the present application. At S140, the partial region is determined according to at least one reference image of the target scene, where a resolution of the reference image is lower than the full-pixel resolution of the image sensor. At S150, the at least one reference image is obtained, and at S160, after the at least one reference image is obtained, the partial region is determined according to a dynamic range of the at least one reference image Although the various embodiments are described herein in the general context of program modules that execute in conjunction with an application program that runs on an operating system on a computer system, a person skilled in the art will recognize that the various embodiments may also be implemented in combination with other types of program modules. Generally, program modules comprise routines, programs, components, data structures and other types of structures that perform particular tasks or implement particular abstract data types. It can be understood by a person skilled in the art that the various embodiments described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The foregoing embodiments are only used to describe the present application, but not to limit the present application. A person of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. A method, comprising:

exposing, by a device comprising a processor, an image sensor;

determining a partial region of the image sensor according to at least one reference image of a target scene, wherein a resolution of the at least one reference image is lower than a full-pixel resolution of the image sensor;

reading a charge on the image sensor and performing analog-to-digital conversion, wherein a charge of pixels on the partial region of the image sensor is read by means of pixel binning according to data characteristics of an image of the target scene, the data characteristics of the image of the target scene being features that represent a grayscale distribution, an amount of noise, and an amount of information of the image; and obtaining a target image of the target scene according to the charge on the image sensor, wherein the partial region does not comprise a region having semantic information that exceeds a preset threshold.

2. The method of claim 1, wherein the determining the partial region according to the at least one reference image of the target scene comprises:

determining the partial region according to a dynamic range of the at least one reference image.

3. The method of claim 2, wherein the determining the partial region according to the at least one reference image of the target scene comprises:

analyzing a histogram of the at least one reference image region by region; and determining the partial region according to the histogram.

4. The method of claim 3, wherein the determining the partial region according to the histogram comprises:

determining a target region according to a preset threshold number of pixels;

performing upsampling processing on the target region according to the full-pixel resolution of the image sensor; and determining the partial region on the image sensor corresponding to the target region.

5. The method of claim 3, wherein the determining the partial region according to the histogram comprises:

determining a target region according to a preset information entropy threshold;

performing upsampling processing on the target region according to the full-pixel resolution of the image sensor; and determining the partial region on the image sensor corresponding to the target region.

6. The method of claim 3, wherein the region in the "region by region" is a region of an irregular shape.

7. The method of claim 1, wherein the determining the partial region according to the at least one reference image of the target scene comprises:

determining the partial region according to a signal-to-noise ratio of the at least one reference image.

8. The method of claim 7, wherein the determining the partial region according to the at least one reference image of the target scene comprises:

performing downsampling processing on a second reference image of a second resolution according to a first reference image of a first resolution in the at least one reference image, wherein the first resolution is lower than the second resolution;

determining, according to an image obtained by the downsampling processing and the second reference image, a mean square error of noise signals region by region;

determining a target region on the second reference image according to the mean square error;

performing upsampling processing on the target region according to the full-pixel resolution of the image sensor; and determining the partial region on the image sensor corresponding to the target region.

9. The method of claim 1, wherein the determining the partial region according to at least one reference image of the target scene further comprises:

detecting respective semantic information of the at least one reference image.

10. The method of claim 1, further comprising:
obtaining the at least one reference image.

11. An apparatus, comprising:

a processor, coupled to a memory, that executes or facilitates execution of executable modules, comprising:

an exposure control module configured to expose an image sensor;

a determining module configured to determine a partial region of the image sensor according to a reference image of a target scene, wherein a resolution of the reference image is lower than a full-pixel resolution of the image sensor;

an analog-to-digital conversion module configured to read a charge on the image sensor and perform analog-to-digital conversion, wherein a charge of pixels on the partial region of the image sensor is read by pixel binning according to data characteristics of an image of the target scene, the data characteristics of the image of the target scene being features that represent a grayscale distribution, an amount of noise, and an amount of information of the image; and a processing module configured to obtain a target image of the target scene according to the charge on the image sensor, wherein the partial region does not comprise a region having semantic information that exceeds a preset threshold.

12. The apparatus of claim 11, wherein the determining module determines the partial region according to a dynamic range of the reference image.

13. The apparatus of claim 12, wherein the determining module comprises:

an analysis unit configured to analyze a histogram of the reference image region by region; and a determining unit configured to determine the partial region according to the histogram.

14. The apparatus of claim 13, wherein the determining unit comprises:

a target region determining subunit configured to determine a target region according to a preset threshold number of pixels;

a processing subunit configured to perform upsampling processing on the target region according to the full-pixel resolution of the image sensor; and a partial region determining subunit configured to determine the partial region on the image sensor corresponding to the target region.

15. The apparatus of claim 13, wherein the determining unit comprises:

a target region determining subunit configured to determine a target region according to a preset information entropy threshold;

a processing subunit configured to perform upsampling processing on the target region according to the full-pixel resolution of the image sensor; and a partial region determining subunit configured to determine the partial region on the image sensor corresponding to the target region.

16. The apparatus of claim 12, wherein the semantic information of the region is first semantic region, and wherein the determining module is further configured to detect second semantic information of the reference image.

17. The apparatus of claim 11, wherein the determining module determines the partial region according to a signal-to-noise ratio of the reference image.

18. The apparatus of claim 17, wherein the determining module comprises:

a first processing unit configured to perform downsampling processing on a second reference image of a second resolution according to a first reference image of a first resolution in the reference image, wherein the first resolution is lower than the second resolution;

a calculating unit configured to calculate, according to an image obtained by the downsampling processing and the second reference image, a mean square error of noise signals region by region;

a target region determining unit configured to determine a target region on the second reference image according to the mean square error;

a second processing unit configured to perform upsampling processing on the target region according to the full-pixel resolution of the image sensor; and a partial region determining unit configured to determine the partial region on the image sensor corresponding to the target region.

19. The apparatus of claim 11, wherein the executable modules further comprise:

a reference image obtaining module configured to obtain the reference image.

20. A computer readable storage device, comprising at least one executable instruction, which, in response to execution, causes a system comprising a processor to perform operations, comprising:

exposing an image sensor;

determining a partial region of the image sensor according to at least one reference image of a target scene, wherein a resolution of the at least one reference image is lower than a full-pixel resolution of the image sensor;

reading a charge of the image sensor and performing analog-to-digital conversion, wherein a charge of pixels on the partial region of the image sensor is read using pixel binning according to data characteristics of an image of the target scene, the data characteristics of the image of the target scene being features that represent a grayscale distribution, an amount of noise, and an amount of information of the image; and obtaining a target image of the target scene according to the charge of the image sensor, wherein the partial region excludes a region having semantic information that exceeds a preset threshold.

21. The computer readable storage device of claim 20, wherein the operations further comprise:

determining the partial region according to a signal-to-noise ratio of at least one reference image of the target scene.

22. The computer readable storage device of claim 20, wherein the determining the partial region comprises determining the partial region according to a dynamic range of the at least one reference image.

23. A device for image acquisition, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:

exposing an image sensor;

determining a partial region of the image sensor according to a reference image of a target scene, wherein a resolution of the reference image is lower than a full-pixel resolution of the image sensor;

reading a charge of the image sensor and performing analog-to-digital conversion, wherein a charge of pixels on a partial region of the image sensor is read by pixel binning according to data characteristics of an image of a target scene, the data characteristics of the image of the target scene being features that represent a grayscale distribution, an amount of noise, and an amount of information of the image; and obtaining a target image of the target scene according to the charge of the image sensor, wherein the partial region does not comprise a region having semantic information that exceeds a preset threshold.

24. The device of claim 23, wherein the operations further comprise:

determining the partial region according to a signal-to-noise ratio of the reference image of the target scene.

* * * * *